United States Patent Office 3,452,812
Patented July 1, 1969

3,452,812
BODY HEATING AND COOLING GARMENT
John Crowther Betts, Muswell Hill,
London N. 10, England
Filed July 10, 1967, Ser. No. 652,163
Int. Cl. F28f 7/00; A61f 7/06; A41d 31/00
U.S. Cl. 165—46                                15 Claims

ABSTRACT OF THE DISCLOSURE

A body garment is comprised of two panels of flexible material. Each panel consists of two layers which are joined at their periphery and at predetermined surfaces to form interconnecting cavities for the movement of fluid. A tubular passage is secured between the panels and interconnects the cavities.

Background of the invention

A body heating and cooling under garment is known in which continuous, flexible pipes or tubes are threaded through an open mesh nylon fabric from which the under garment. This method of manufacture of the under gar- the loops of the fabric and forming a system of channels which serve to circulate or conduct a heated or cooled liquid throughout the effective surface area of the under garment. This method of manufacture of the under garments is both expensive and complicated, and moreover makes the garment unduly heavy and in certain cases uncomfortable to the wearer due to the stiffening caused by the pipe system.

Summary of the invention

The present invention aims at obviating the foregoing disadvantages, and to this end consists in a body heating and cooling garment (as hereinbefore defined), comprising at least two shaped panels connected to one another and each formed of two layers of flexible material secured together in superposed relationship along at least part of their periphery and at predetermined surface regions of said layers to form intercommunicating cavities between said layers, tubular means for interconnecting the cavities of one panel with those of an adjacent panel, inlet means in one of said panels for supplying a heated or cooled fluid to said cavities, and outlet means separated from said inlet means for discharge of the fluid from said cavities, the latter being so arranged and distributed throughout the area of said layers as to cause said fluid to be circulated through said cavities in said panels, whereby to heat or cool the body of the wearer of the garment.

Advantageously, the securing together of said layers is effected by means of clips, staples or by means of stitching, adhesive bonding, welding or vulcanizing, or any combination of these processes.

Preferably, pressure sensitive adhesive is used for securing together said layers of material.

Conveniently, the layers of material consist of textile fabric, rubber, plastics or foam material, or any combination of these materials.

In order that the invention may be more readily understood, reference is made to the accompanying drawings which illustrate diagrammatically and by way of example, one embodiment thereof, and in which.

Figure 1:
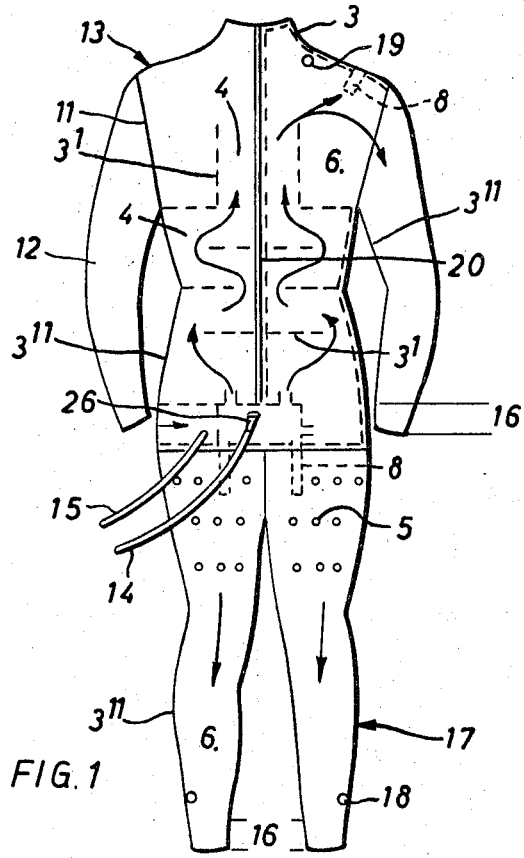
FIG. 1 is a front view of a suit constructed in accordance with the invention.
Figure 3:
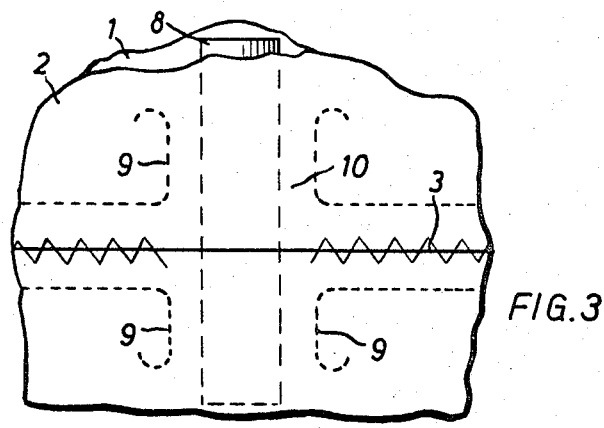
FIG. 3 is a fragmentary plan view of a junction between two panels of the suit.
Figure 4:
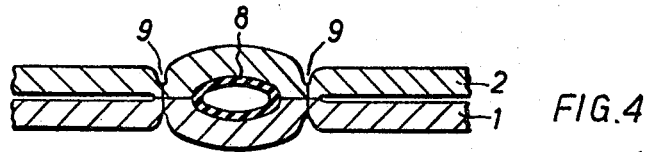
FIG. 4 is a cross-section of FIG. 3.
Figure 2:
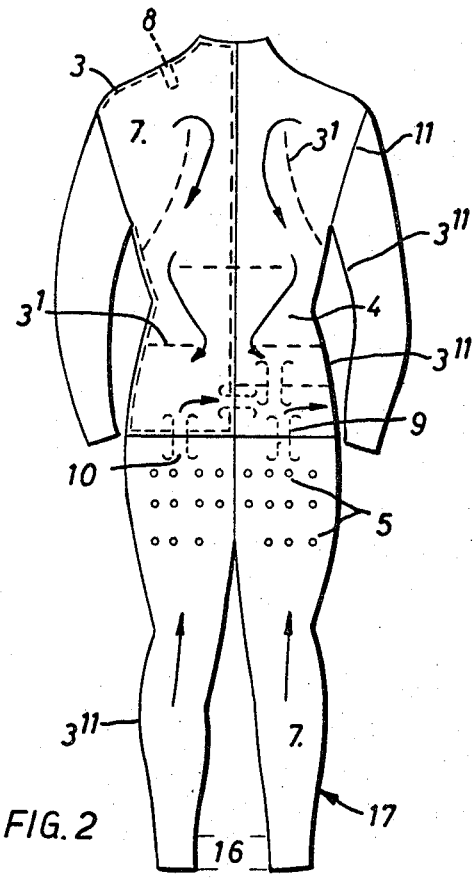
FIG. 2 is a rear view of the suit of FIG. 1.
Figure 5:
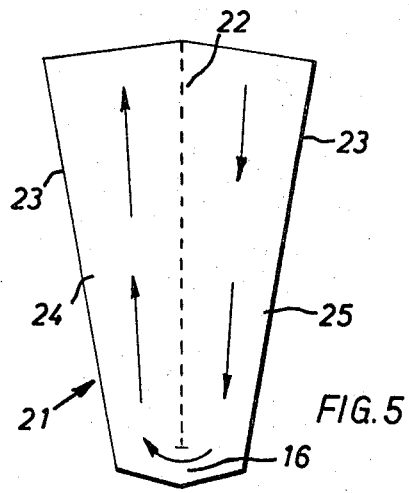
FIG. 5 is a plan view of a panel of which the sleeve of the suit is constituted.

Referring to the drawings, the suit illustrated is intended for heating the body of the wearer by means of heated water and is manufactured from a flexible material consisting of two layers 1 and 2 each of ⅛ inch nylon-lined unicellular foam neoprene. The two layers 1 and 2 are secured together in superposed relationship by lines of stitching 3 along at least part of their periphery and at predetermined surface regions 3' to form interconnected cavities or channels 4 for the passage of water therethrough. At spots or points 5 the two layers 1 and 2 are secured together in the manner of quilting to produce a substantially continuous heat exchange surface and to prevent undue distension of the cavities from compressing the wearer. The spots or points 5 of the quilting are distributed nonsymetrically, that is the spacing between the spots transversely to the general direction flow of water (indicated by arrows) is smaller than it is in the direction of the flow.

In the embodiment illustrated line stitiching 3' is used for the upper part of the suit, while in the bottom part, that is the legs quilting 5 is employed. Alternatively, either line stitichings or quiltings may be employed for the whole of the suit.

The trunk and leg parts of the suit illustrated are made up of a plurality of individual front panels or sections 6 and rear panels 7.

Each sleeve 12 is made of one panel 21 of the flexible material, the two layers thereof being first secured together by a line of stitching 22 running longitudinally in the middle of the panel and terminating at a predetermined distance from the bottom edge of the panel. When the panel 21 is folded and the longitudinal edges 23 join together to form the sleeve 12, two separate cavities 24, 25 are provided which are interconnected by passage 16 formed by the discontinued stitching line 22.

Each panel 6 or 7 of the suit is marked out on the nylon covered side of a layer or sheet of the material together with the desired pattern of channels or quilting. This sheet is then laid on another sheet of the same material with the two neoprene sides in apposition. The two layers or sheets are then sewn together substantially round the periphery of the marked out panel about ⅜ inch inside the marked out border. A zigzag type of stitch has been found satisfactory using nylon or terylene thread but the stitching may be of any type or thread, the only requirement being that it be tight and close enough to compress the material and minimise leakage from the areas of stitching. Before completing this stage solid or hollow members of suitable material serving to prevent the collapse of the cavities may be inserted in the interior of the panel and secured in position.

Where the pattern indicates that a connecting pipe 8 is to enter the panel a gap is left in the otherwise continuous stitching 3 round the periphery and at the point of entry the stitching is carried inwards from the ends of the gap as at 9 to form a short channel 10 running inwards, in which the pipe 8 can be glued or placed to form a connection to the adjacent panel. Instead of continuous pipes, spirals of wire or plastics may be used for the connecting passage.

At this stage the panels may be cut out from the sheet and the remainder of the channels 4 and quilting 5 formed by stitching.

The junction 11 of the sleeve 12 and shoulder 13 exemplifies a different type of connection between panels which may be employed where the minimum resistance to flow is required. Along the junction 11 the periphery of the adjacent panels is not sewn together but the inner and outer layers 1 and 2 are respectively glued, using a pressure sensitive adhesive, and sewn to the corresponding layers in the adjacent panel thus forming a tubular passage utilising the whole length of the seam for the flow of the water.

The suit may now be completed in a conventional manner by adhesive bonding with a pressure sensitive adhesive or stitching 3" or a combination of both, gaps being left in the stitching where it would cross a pipe or insert.

In the present embodiment the suit is used for heating the body of the wearer by continuous circulation of hot water supplied from a suitable source, such as a hot water reservoir disposed in the immediate vicinity of the user or a heater disposed above the surface of the water, for example, on an accompanying water craft. The inlet and outlet pipes 14 and 15 for the hot water circulation are fastened into short U-shaped channels formed by stitching in the body of a convenient front panel. The inlet pipe 14 is provided with a nonreturn valve 26 of conventional type, for example, a spear valve.

Thus in the suit described water flows from the lower end of the front of the trunk along the channels 4 formed by the lines of stitching 3' to the sleeves 12 where the whole of the front of the sleeve panel is used as a channel. It then passes via the junction 16 to the rear of the sleeve panel where on the rear side of the suit it flows back through a similar but reversed sequence of channels. Flow to the legs 17 is similarly arranged except that on the thighs quilting is employed because of the larger areas involved.

Instead of providing a closed circuit for the circulation of the heat exchange medium, it may be preferable in some circumstances to run the medium to waste after circulating the suit once.

A relief valve 18 is provided to prevent damage due to any excessive rise in pressure at the lower end of the suit on emerging from the water and can be manually released in order to drain the suit after use.

Reference numeral 19 indicates a purge valve serving to vent air from the suit when commencing to use it, and 20 is the usual sliding clasps fastener.

After completion of the suit a thin rubber latex suspension in water is circulated through the suit in order to seal minor leaks through small perforations that may be left by the stitching process. Warm air is afterwards blown through to coagulate the latex in place and when it is dry powdered talc is blown through to prevent unwanted adhesion of the internal surfaces.

Instead of passing the rubber latex suspension to seal any minor leaks in the panels, a layer of paint or a thin sheet of any of the materials mentioned before may be applied to the exterior and interior of the otherwise completed suit.

The shape, area and direction of the channels may be varied as required by altering the lines or points at which the two layers are secured together during manufacture. The method of the invention is particularly applicable to complete suits of the boiler suit type but is equally applicable to suits made in separate sections as intercommunications between the cavities or channels in each part may easily be made.

Alternatively the channels may be formed in a separate undergarment constructed in a similar manner by securing together two layers of any suitable flexible material to form channels or quilting. Such an undergarment may be complete or partial, such as a vest.

Instead of stitching, the securing together of the two layers of material to form the cavities or channels may be effected by means of clips or by means of adhesive bonding, welding or vulcanising or by any combination of these processes. When adhesive bonding is employed, for example, in the case of securing together sheets or layers of foam neoprene, foam rubber, sheet neoprene, rubber, plastics and the like material, the channels may be formed by leaving the desired areas free from adhesive.

The production of such laminated material may be simplified by coating the desired pattern of adhesive on one surface of the material and the opposing surface to which this is applied after coating may be either similarly patterned with adhesive or to avoid the necessity for accurate registration of adhesive, patterns may be fully coated with glue or left unglued. Alternatively by using a pressure sensitive adhesive both surfaces may be covered with a series of stripes which when the surfaces are mated together are applied at an angle to one another so that adhesion only takes place where the adhesive lines cross producing a quilt-like pattern of channels. The adhesive patterns may be formed by hand application, or by the use of suitably shaped rollers by hand or in a coating machine.

The formation of the cavities or channels may be simplified by coating all the opposing surfaces of the sheet material with adhesive and that where it is desired to form channels the adhesive be rendered ineffective.

The adhesive may be rendered ineffective by several means such as marking out the desired pattern of channels on one or both glued surfaces, prior to mating them together, with a paint or powdered material such as talc either dry or in suspension in a liquid such as water. On mating the two surfaces together adhesion will not take place where the surface of the glue has been painted or powdered, and a pattern of channels corresponding to the original markings will result.

Alternatively a thin solid pattern of paper, gelatins or other suitable material may be laid between the surfaces to be bonded together to achieve the same result. This pattern, the paint or the powder may if desired be of some soluble substance which may be washed away after the channels have been formed and the adhesive is no longer tacky.

Before the two surfaces are mated together any inserts, valves, piping or such like which it is desired to incorporate in the channelling may be attached in their correct positions in the channelling pattern.

These processes may be applied to the individual panels after cutting out or alternatively the bulk sheets of material may be bonded together with a preformed meshwork of channels and the panels cut out subsequently from the laminated material. In the latter case it is proposed that the margins of the sheet may be unstuck subsequently to allow of the insertion of connecting pipes to panels and inserts for such purposes as the diffusion of flow and to prevent channels collapsing under external pressure. The sheets may then be stuck together again to seal round such pipes and inserts and to form each panel into a fluid tight compartment.

It is proposed that connections between panels may be produced by arranging that the pipes inserted in opposing edges of the panels meet and are joined together by such means as sliding one pipe into the other or by the use of tubular connecting inserts.

To facilitate emptying of the suit after use it is proposed that dependent parts of the suit be connected by noncollapsible tubes to the circulating pump in order that this may by the operation of suitable valves be used to empty the suit of fluid. Alternatively or in addition valves may be placed at dependent parts of the suit to facilitate emptying of the suit by gravity It is additionally proposed that such dependent parts of the suit be provided with relief valves to ensure that in the event of excessive pressure being built up in the suit fluid is vented before the rise in pressure causes damage to the fabric. Such valves may also be constructed so as to be able to combine the drainage function described previously.

It is proposed that the return flow from the panels of the suit be restricted in such a way as to control the flow through each panel and also to ensure that the channels throughout the whole of each panel are under sufficient internal pressure to keep them distended with fluid. Such restriction may be by providing a narrow return pipe, by a control valve or by a restrictor in the lumen of the pipe. Alternatively the same effect may be achieved by pumping a sufficient quantity of fluid into the suit to ensure inflation of its channels.

It is proposed that the gloves of such a suit may be made as described in the foregoing or alternatively the whole or part of the glove especially the fingers may be made from two layers of thin rubber-like or foam material separated by a meshwork such as a loosely knitted fabric and the circulating fluid fed to or drawn off from the fingers by small pipes running along the back of the fingers.

It will be understood that the invention has been described only by way of example and that various alterations could be made to the specific details heretofore disclosed without in any way departing from its scope. Other materials such as rubber latex sheet, plastic sheet and other foam materials bonded by other methods such as vulcanising or welding with different arrangements of the channels and panels may be employed.

I claim:

1. A body heating and cooling garment comprising at least two shaped panels connected to one another and each formed of two layers of flexible material; means for securing said two layers together in superimposed relationship along at least part of their periphery and at predetermined surface regions of said layers of each panel to form a plurality of intercommunicating cavities between said layers of each panel; tubular passage means for interconnecting the cavities of one panel with those of an adjacent panel; inlet means in one of said panels for supplying a heated or cooled fluid to said cavities; and outlet means separated from said inlet means for discharge of fluid from said cavities, the latter being so arranged and distributed throughout the area of said layers so as to cause said fluid to be circulated through said cavities in said panels, whereby to heat or cool the body of the wearer of the garment.

2. A garment as defined in claim 1, wherein said passage means for interconnecting a cavity in one panel with that of an adjacent panel include connecting means defining an open passage, said connecting means being inserted between the layers of adjacent panels and extending from the cavity of said one panel into the cavity of the adjacent panel.

3. A garment as defined in claim 2, wherein said connecting means comprises a tube.

4. A garment as defined in claim 2, wherein said connecting means comprises a spiral of resilient material.

5. A garment as defined in claim 1, wherein said securing means comprise staples.

6. A garment as defined in claim 1, wherein said securing means comprise clips.

7. A garment as defined in claim 1, wherein said securing means comprise rows of stitches.

8. A garment as defined in claim 1, wherein said securing means comprise adhesive bonding material.

9. A garment as defined in claim 8, wherein said adhesive bonding material is in the form of a pressure sensitive adhesive.

10. A garment as defined in claim 1, wherein said securing means comprise a weld seam.

11. A garment as defined in claim 1, wherein said securing means at said predetermined surface regions of said layers extend along spaced lines so as to form continuous channels for the flow of the fluid therethrough.

12. A garment as defined in claim 1, wherein said securing means at said predetermined surface regions of said layers are placed at points spaced apart and distributed throughout the surface of said layers in the manner of quilting.

13. A garment as defined in claim 12, wherein said points are distributed non-symmetrically in such a manner that the spacing between the points transversely to the general direction of flow of the fluid is smaller than the spacing in the direction of said flow.

14. A garment as defined in claim 1, wherein at the junction of adjacent panels the two layers of one panel are respectively secured to the layer of the adjacent panel to thus form said tubular passage means at said junction.

15. A garment as defined in claim 1, wherein said means for securing predetermined surface regions of said layers to each other comprise a row of stitches along spaced lines in at least one of said panels and connected spaced apart points in at least a panel adjacent to said one panel.

References Cited

UNITED STATES PATENTS

| 2,397,232 | 3/1946 | Barnes et al. | 165—46 |
| 2,657,396 | 11/1953 | Klein et al. | 165—46 XR |
| 2,935,748 | 5/1960 | Sabo | 165—46 XR |
| 3,242,979 | 3/1966 | Shlosinger | 165—46 |
| 3,307,554 | 3/1967 | Thornton et al. | 128—402 |
| 3,348,236 | 10/1967 | Copeland | 2—81 XR |

FOREIGN PATENTS

| 600,489 | 4/1948 | Great Britain. |
| 501,717 | 11/1954 | Italy. |

FRED C. MATTERN, Jr., *Primary Examiner.*

MANUEL ANTONAKAS, *Assistant Examiner.*

U.S. Cl. X.R.

2—81; 126—204